A. J. HORTON.
MOTOR CONTROLLER.
APPLICATION FILED FEB. 10, 1917.

1,303,319.

Patented May 13, 1919.
2 SHEETS—SHEET 1.

Inventor
Albert J. Horton
By Frank A. Hubbard
Attorney

A. J. HORTON.
MOTOR CONTROLLER.
APPLICATION FILED FEB. 10, 1917.
1,303,319.
Patented May 13, 1919.
2 SHEETS—SHEET 2.
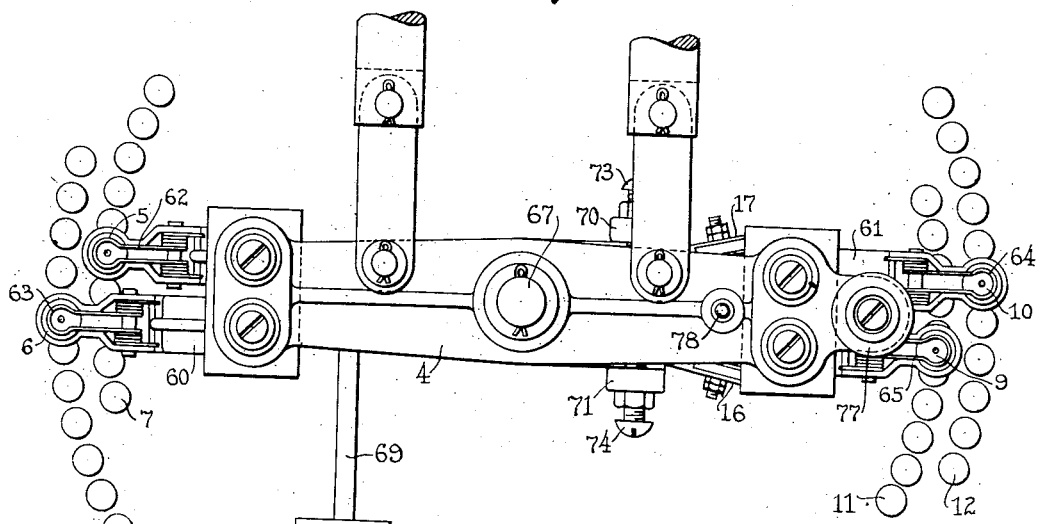
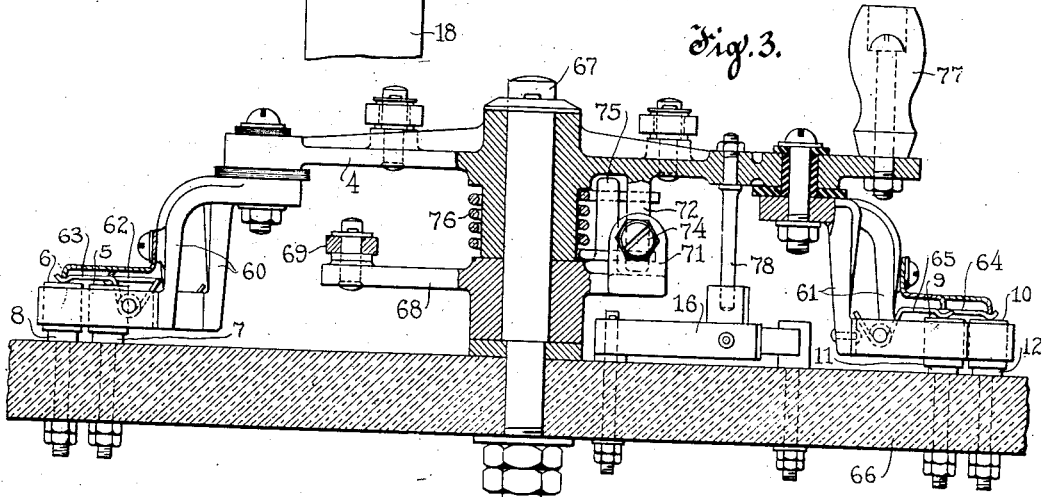
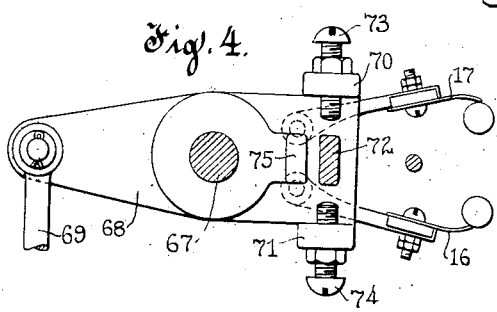
Inventor
Albert J. Horton.
By Frank H. Hubbard
Attorney

UNITED STATES PATENT OFFICE.

ALBERT J. HORTON, OF WHITE PLAINS, NEW YORK, ASSIGNOR TO THE CUTLER-HAMMER M'F'G CO., OF MILWAUKEE, WISCONSIN, A CORPORATION OF WISCONSIN.

MOTOR-CONTROLLER.

1,303,319. Specification of Letters Patent. Patented May 13, 1919.

Application filed February 10, 1917. Serial No. 147,788.

*To all whom it may concern:*

Be it known that I, ALBERT J. HORTON, a citizen of the United States, residing at White Plains, in the county of Westchester and State of New York, have invented new and useful Improvements in Motor-Controllers, of which the following is a full, clear, concise, and exact description, reference being had to the accompanying drawing, forming a part of this specification.

This invention relates to controllers for electric motors and more particularly to speed regulating controllers therefor.

It is frequently desired to effect substantially synchronous operation of the driving motors of associated devices and it has heretofore been proposed to secure such synchronous operation by providing the motors with communicating devices coöperable to effect field regulation of one motor upon variations in the relative speeds of the motors to thereby rectify such variations. Further, it has been proposed in connection with this method to initially adjust the motors by field regulation thereof for approximately the same speeds and while said method is in general quite satisfactory, much difficulty has been experienced due to the varying actions of the motors when starting one or both in a cold state. Also, difficulty has been experienced in effecting promptness of response of the controlled motor to its regulating means without an abnormal ultimate variation of its field strength.

The present invention has among its objects to provide means for effecting substantially synchronous operation of a plurality of motors according to the method mentioned which will overcome the foregoing difficulties.

A further object is to provide a regulating device operable manually or automatically for a gross regulating effect and thereafter operable automatically for a definite curtailment of the gross regulating effect thereof.

Other objects and advantages of the invention will hereinafter appear.

The accompanying drawings illustrate one embodiment of the invention which will now be described, it being understood that the embodiment illustrated is susceptible of various modifications without departing from the scope of the appended claims.

In the drawings,

Figs. 2, 3 and 4 are detail views of the regulating device diagrammatically shown in Fig. 1;

Figure 1:
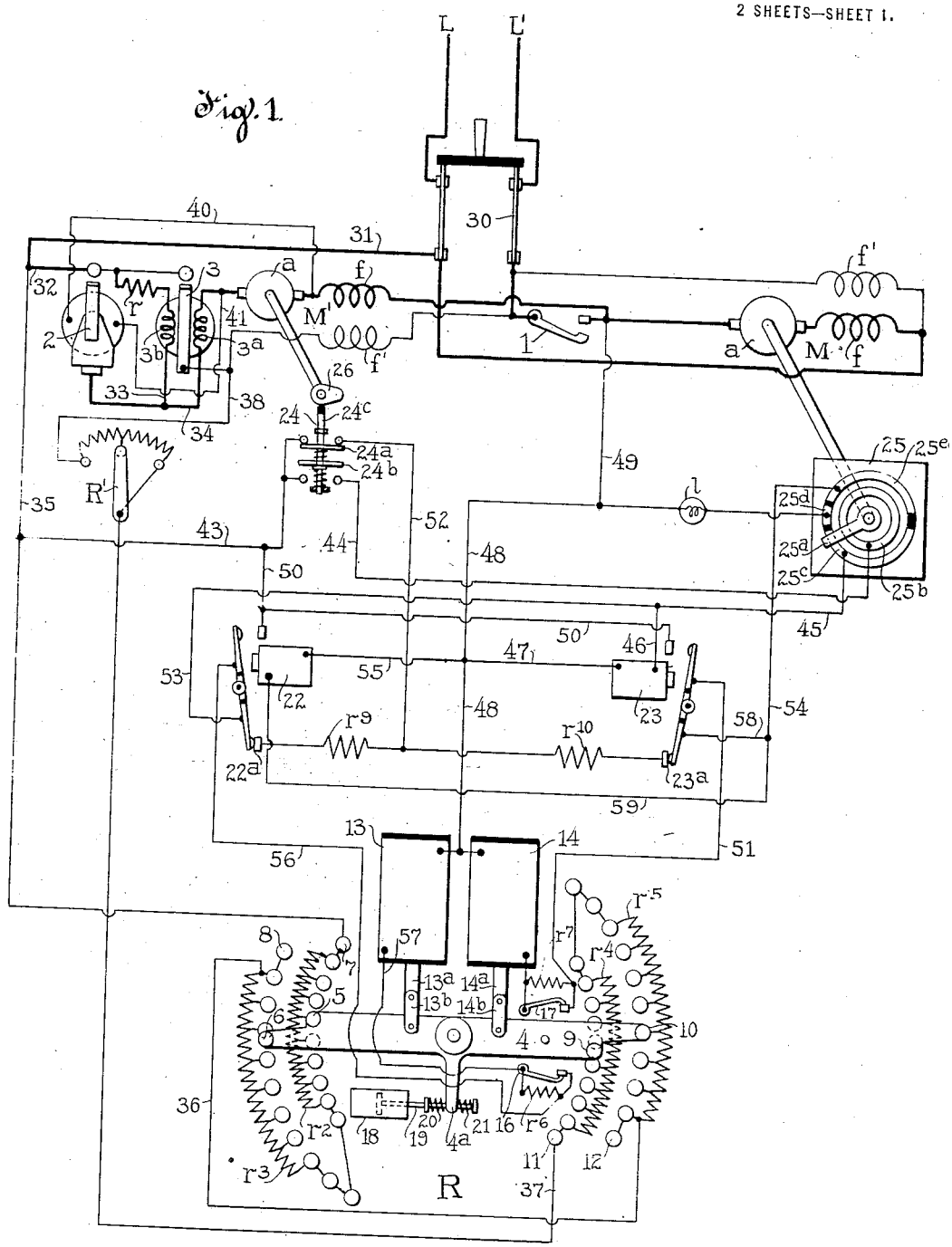
Figure 1 is a diagrammatic view of the controller.

Referring to Fig. 1, the same shows two compound motors M and M' each having an armature $a$, a series field winding $f$ and a shunt field winding $f'$. It is assumed that the motor M operates a leading machine and the motor M' a following machine which it is desired to synchronize with the former. The details of control of the motor M are therefore not essential to an understanding of the invention and the motor has accordingly merely been shown as provided with a main switch 1, it being assumed that said motor operates at a substantially constant speed.

The motor M' is shown as provided with a starting resistance $r$ in series therewith and an electro-responsive switch 2 to short-circuit said resistance, said switch having its operating winding connected across the terminals of the armature $a$ for response at a given counter-voltage of said motor. Also, this motor is provided with an electromagnetically controlled field regulating rheostat R, a manually adjustable field rheostat R' and a vibrating relay 3 for including said rheostats in circuit upon exclusion of the starting resistance $r$. This relay is provided with two cumulative coils $3^a$ and $3^b$ both included in series with the motor M', the former permanently and the latter initially included but subject to exclusion thereof with the starting resistance $r$. The two coils insure closure of said relay for exclusion of all field resistance until the motor is accelerated by exclusion of resistance $r$, whereupon said relay is rendered effective to accelerate the motor by alternate inclusion and exclusion of the field resistances according to current conditions in the armature circuit, in the usual manner. The rheostat R' is provided for initial adjustment of the speed of motor M' according to the speed setting of the leading motor M and as will be understood the same requires no further adjustment.

The rheostat R comprises a centrally pivoted contact arm 4, one end thereof carrying contact brushes 5 and 6 to sweep over series of contacts 7 and 8 respectively and the other end thereof carrying contact brushes 9 and 10 to sweep over series of contacts 11 and 12 respectively. The contacts 7 and 8 are arranged in a staggered relation and are respectively connected to field resistances $r^2$ and $r^3$, while the contacts 11 and 12 are similarly arranged and respectively connected to field resistances $r^4$ and $r^5$. The lowermost contacts 7 and 8 are electrically connected and the uppermost contacts 11 and 12 are electrically connected whereby with the circuit connections hereinafter described the resistances $r$ to $r^5$ are in series and subject to gradual inclusion and exclusion by counter-clockwise and clockwise movements of the contact arm 4 respectively. For effecting such movements of the arm 4, operating solenoids 13 and 14 are provided, the former having its plunger $13^a$ connected to said arm on the left hand side of its pivot by link $13^b$ and the latter having its plunger $14^a$ connected to said arm on the right hand side of its pivot through a link $14^b$. The solenoid 13 when energized thus provides for clockwise movement of the arm 4 to gradually exclude the field resistances, while the solenoid 14 serves to move the arm counter-clockwise to gradually include said resistances, said arm being shown in a position to include substantially one-half of the total of said resistances. The solenoids as will hereinafter appear, are adapted to be energized selectively by automatic control means and the arm 4 has associated therewith limit switches 16 and 17 to be actuated thereby selectively in extreme positions thereof to include resistances $r^6$ and $r^7$ in circuit with said solenoids respectively.

The rheostat R also has associated therewith a double acting dash pot 18 to retard movement of the arm 4 in both directions. As diagrammatically shown, this dash pot is provided with a piston rod 19 having a lost motion connection with a right angle extension $4^a$ of the arm 4 through opposed springs 20 and 21. Thus with the arm 4 in any position the extension thereof being centered between the springs, said arm may be moved a given angular distance, for example, over three contacts, independently of the dash pot and subject only to the opposition of the spring compressed thereby. On the other hand, as soon as the angular movement of the arm 4 exceeds the range mentioned, the dash pot acts to retard said arm until brought to rest. Then assuming de-energization of both operating solenoids the compressed spring effects a return movement of said arm equal to its initial movement independently of the dash pot, previously assumed to correspond to three contacts. Thus the rheostat is rendered substantially quickly responsive through a given range to the initial pull of either operating solenoid whereas it is thereafter subjected to dash-pot retardation and to a bias for partial return movement when relieved of solenoid pull.

The automatic control means for the solenoids 13 and 14 comprises electro-responsive relays 22 and 23 responsive to energize said solenoids respectively and in turn energizable selectively by switches 24 and 25 operable respectively by the motors M and M'. The switch 24 is provided with two sets of stationary contacts and with movable contact members $24^a$ and $24^b$ each adapted to bridge a pair of stationary contacts. These bridging contact members are slidably mounted upon a rod $24^c$ and are biased apart by a spring interposed between the same. The rod $24^c$ is biased to engage member $24^a$ with its stationary contacts and is provided with shoulders above and below the members $24^a$ and $24^b$ to abut the same, said shoulders being so spaced that during upward movement of the rod $24^c$ the member $24^a$ reëngages its stationary contacts prior to disengagement of member $24^b$ with its stationary contacts. The rod is operable by a cam 26 shown as fixed to an extension of the armature shaft of motor M' the contour of said cam being such as to effect depression of the rod $24^c$ once during each revolution of said armature but only for a relative short period. The switch 25 is shown as comprising a revoluble contact arm $25^a$ continuously engaging a segment $25^b$ and adapted to bridge said segment with concentric segments $25^c$, $25^d$ and $25^e$. The arm $25^a$ is shown as fixed to an extension of the armature shaft of motor M whereby it is caused to make one complete revolution of said armature and during each revolution to engage progressively the last three mentioned segments. It is, of course, to be understood that the switches 24 and 25 might be alike or of other types than those illustrated and might be operatively connected to the driven machines instead of to the motors and geared for any desired speed ratios.

The arrangement is such as to necessitate depression of switch 24 and engagement of contacts $25^a$ and $25^c$ of switch 25 to energize relay 23 for energization of solenoid 14 and to necessitate depression of switch 24 and engagement of contacts $25^a$ and $25^e$ of switch 25 to energize relay 22 for energization of solenoid 13. Depression of switch 24 only during engagement of contacts $25^a$ and $25^b$ of switch 25 does not effect either relay and it is to be assumed that depression of the switch 24 is so timed as long as the motors operate in absolute synchronism. When, however, the motor M′ either lags behind the motor M or exceeds the speed thereof, it depresses switch 24 while the arm 25$^a$ is in an angular position to engage segment 25$^c$ or 25$^e$ according to the character of speed variation of motor M′. This in turn effects energization of relay 22 or 23 according to the character of speed variation of motor M′ and energization of the corresponding solenoid to increase the field resistance upon lagging of motor M′ and to decrease the field resistance if the speed of motor M′ is excessive. As will hereinafter appear, the "up" contacts of switch 24 provides for continued energization of the selected relay until said switch is again depressed and as will be understood, such depression of the switch 24 before correction of the speed of motor M′ by the previously selected relay serves to reëstablish the energizing circuit of the same relay for prolongation of its regulative action. Accordingly, with the rheostat construction described, energization of either solenoid 13 or 14 effects a quick movement of the arm 4, unretarded by the dash pot, through a given range previously assumed to be three buttons, and then through a further range of one or more buttons subject to dash-pot retardation, dependent upon the duration of energization of the selected solenoid. Then upon deënergization of the selected solenoid the arm 4 returns through a range equal to three buttons, thus curtailing the gross speed adjustment accordingly. It will thus be apparent that the rheostat provides for quick response of the following motor M′ to meet the need of either quick acceleration or quick deceleration, whereas it effects an ultimate regulation only to the extent of its net travel.

Considering now in further detail the circuit arrangement illustrated, current is supplied to both motors and to the several electromagnetic devices from a common circuit L, L′, through a double pole switch 30, the continuity of circuit of the two motors being shown for convenience as controlled by switch 1. Motor M has its armature and series field connected directly across the supply circuit through switch 1 and has its shunt field permanently connected across said circuit. The circuit of motor M′ on the other hand, extends from line L by conductors 31 and 32 through resistance $r$ and winding 3$^b$ of relay 3, by conductors 33 and 34 through the winding 3$^a$ of said relay and thence through the armature and series field of said motor to and through switch 1 to line L′, while its shunt circuit extends from line L by conductors 31 and 35 through the resistance $r^2$, rheostat arm 4 and resistance $r^3$, by conductor 36 through resistance $r^5$, rheostat arm 4 and resistance $r^4$, by conductor 37 through rheostat R′, by conductor 38 through the shunt field winding of said motor to line L′. However, immediately upon completion of the armature circuit as traced, the relay 3 is energized to short circuit both field rheostats, said short circuit extending from conductor 32 to and through said relay to conductor 38 and thence directly to the shunt field windings. The winding of switch 2 has one terminal thereof connected by conductor 40 to the right hand terminal of the armature of motor M′ and its opposite terminal connected by conductor 41 to the left hand terminal of said armature and upon response said switch 1 completes circuit from conductor 32 directly to conductor 34 thereby excluding the resistance $r$ and relay coil 3$^b$. The relay is thus left with only its coil 3$^a$ included in circuit for the purpose set forth.

Assuming depression of switch 24 with switch 25 in the position illustrated, circuit is established from line L by conductors 31, 35 and 43 through the "down" contact of switch 24, by conductor 44, to segment 25$^b$ of switch 25, across arm 25$^a$ to segment 25$^c$, by conductors 45 and 46 through the winding of relay 23, by conductors 47, 48 and 49 to and through the switch 1 to line L′. This effects response of relay 23 which in closing establishes a circuit from line L by conductors 31, 35, 43 and 50 through said switch, by conductor 51 through switch 17, and thence through solenoid 14, by conductors 48 and 49 to and through switch 1 to line L′. This effects response of solenoid 14. Further assuming release of switch 24 but continued engagement of the same contacts of switch 25, the "up" contacts of switch 24 establish a maintaining circuit for relay 23 from conductor 43 through said contacts, by conductor 52 through a resistance $r^9$ through auxiliary contacts 22$^a$ of relay 22, engaged in the open position of said relay, by conductor 53 directly to the winding of relay 23. This provides for continued energization of the relay and continued operation of the rheostat 4 by solenoid 14 until switch 24 is again depressed, whereupon said relay is deënergized to deënergize solenoid 14. In this connection it is to be noted that continued energization of relay 23 is also depending upon the relay 22 remaining in open position which insures against simultaneous closure of said relays.

Again assuming depression of switch 24 but with the arm 25$^a$ of switch 25 in engagement with segment 25$^e$, circuit is completed from line L to segment 25$^b$, as already traced, thence across arm 25$^a$ to segment 25$^e$ by conductor 54 through the winding of relay 22, by conductors 55, 48 and 49 to and through switch 1 to line L′. This effects response of relay 22 which establishes circuit from line L by conductors 50 and 56 through switch 16, by conductor 57 through the winding of solenoid 13 to conductor 48 and thence to line L' as already traced. Then assuming release of switch 24 during continued engagement of contacts 25ª and 25ᵉ of switch 25, the former switch establishes a maintaining circuit for relay 22 from line L to conductor 52 as already traced, thence through a resistance $r^{10}$ and "down" contacts 23ª of relay 23, which are engaged in open position of said relay, by conductors 58 and 59 directly to the winding of relay 22. Thus the control of relay 22 is in all respects similar to the control above described for relay 23.

Further assuming depression of switch 24 with the arm 25ª of switch 25 in engagement with segment 25ᵈ, which as above stated occurs only when the two motors are in absolute synchronism, circuit is established from line L through switch 24 to segment 25ᵇ, across arm 25ª to segment 25ᵈ, through a lamp $l$ to conductor 49 to and through switch 1 to line L'. Thus energization of the lamp serves to indicate absolute synchronism of the two motors.

Referring now to Figs. 2 to 4, the same show the rheostat arm 4 as provided at opposite ends with contact holders 60 and 61 having sockets for the contacts 5, 6, 9 and 10, illustrated as of the pencil type, and with spring pressure devices 62, 63, 64 and 65 respectively bearing upon said contacts to press the same into firm engagement with the series of contacts over which they slide. The holders 60 and 61 provide for electrical connection for the two contacts carried by each and said holders are both insulated from said arm to render said sets of contacts electrically independent. The series of stationary contacts 7, 8, 11 and 12 are mounted upon a suitable insulating base 66 and the arm is centrally pivoted upon a stud 67 fixed to said base.

Also, the stud 67 has pivotally mounted thereon, in a position between said arm and said base, a member 68, best illustrated in Fig. 4. This member is provided on the left hand side of its pivot with a link 69 to connect the same directly to the piston of a double acting dash pot, such as diagrammatically illustrated in Fig. 1. Also, this member is provided on the opposite side of its pivot with opposed lugs 70 and 71 adapted to straddle a lug 72 on the arm 4, the former lugs being respectively provided with set screws 73 and 74 to abut said lug 72 on opposite sides thereof. These lugs thus provide a lost motion connection between the rheostat arm and the dash-pot such as above described and the set screws 73 and 74 provide for adjustment of the degree of such lost motion. Further, the member 68 is provided with a lug 75 projecting toward the arm 4 but positioned to clear the lug 72 on the latter and a spring 76 is coiled about the hub of said arm with its extremities engaging both lugs 72 and 75 on opposite sides thereof. The spring is thus rendered double acting to center the arm 4 relatively to the member 68 and thus serves the same purpose as the two springs 20 and 21 of the diagrammatic illustration, Fig. 1. In this connection it is to be noted that since the spring 76 centers the arm 4 relatively to the member 68, the lost motion between the arm 4 and dash pot is in effect divided into two ranges and that the set screws carried by the member 68 provide for adjustment of either range independently of the other.

The arm 4 is also provided with a handle 77 by which it may be operated at will and with a pin 78 to operate the switches 16 and 17 at their limits of movement. As shown in Fig. 4, the switches 16 and 17 are of the pivoted arm type and as shown in Fig. 3, they are mounted upon the the panel 66 between the stud 67 and the right hand contacts of arm 4.

What I claim as new and desire to secure by Letters Patent is:

1. The combination with a plurality of motors, of means to synchronize the same including speed regulating means for one, active automatically after a given operation to effect definite curtailment of its regulative tendency incident to such operation.

2. The combination with a plurality of motors, of means to synchronize the same including speed regulating means for one operable to different degrees and active automatically thereafter to curtail its regulative effect for different ultimate degrees of regulation according to the degree of prior operation thereof.

3. The combination with a plurality of motors, of means to synchronize the same including speed regulating means for one quickly responsive for a given degree of regulation and thereafter more slowly responsive for a further degree of regulation, said regulating means being active automatically after response to curtail its regulative tendency incident to such response.

4. The combination with a plurality of motors, of means to synchronize the same including adjustable speed regulating means for one quickly adjustable for a given degree of regulation and more slowly adjustable for subsequent regulation to varying degrees, said regulating means tending upon all adjustment thereof to curtail its regulative effect to a degree corresponding to that resulting from said quick adjustment thereof.

5. The combination with a plurality of motors, of regulating means for one of said motors responsive upon a variation in the relative speeds of said motors for rectifying such speed variation, said means being responsive to a given degree in excess of the required ultimate degree of response thereof and being automatically readjustable after such response thereof to compensate for such excess.

6. The combination with a plurality of motors, of regulating means for one responsive to varying degrees upon different variations in the relative speeds of said motors to insure operation of the motor controlled thereby substantially in synchronism with another, said means being always responsive to a definite degree in excess of the ultimate degree of regulation required for any given speed variation of said motors and being automatically readjustable after response thereof to compensate for such excess.

7. The combination with a plurality of motors, of regulating resistance for one and means responsive to a variation in the relative speeds of said motors to offset the same by regulation of said resistance, said means being active automatically after each response thereof to effect a definite curtailment of the resistance regulation accomplished thereby.

8. The combination with a plurality of motors, of regulating resistance for one and means responsive to variations in the relative speeds of said motors to offset the same by corresponding degrees of regulation of said resistance, said means being quickly responsive initially for a given degree of resistance regulation, subject to retardation during response for further resistance regulation and automatically, readjustable to effect definite curtailment of the gross resistance regulation accomplished thereby.

9. The combination with a plurality of motors, of field regulating resistance for one and adjustable means to rectify variations in the relative speeds of said motors by regulation of said resistance, said means having a given gross adjustment and a given net adjustment for a given speed variation and being active automatically upon gross adjustment to effect net adjustment thereof.

10. The combination with a plurality of motors, of electro-responsive regulating means for one adapted upon energization for a given period to effect a given degree of regulation and upon deënergization to curtail such degree of regulation but only to a limited extent and means to energize said electro-responsive means upon variations in the relative speeds of said motors.

11. The combination with a plurality of motors, of electro-responsive regulating means for one adapted upon energization to effect varying degrees of regulation according to the duration of its energization and upon deënergization to effect a definite but only partial curtailment of its regulative tendency incident to such response and means to energize said electro-responsive means upon variations in the relative speeds of said motors and for periods varying with the speed variations.

12. In a motor controller, the combination with a movable resistance controlling member, of a retarding device therefor and an operative connection therebetween permitting a predetermined range of resistance varying movement of said member independently of said retarding device, said member when released being returnable automatically through a range equal to the aforesaid range.

13. In a motor controller, the combination with a resistance controlling member movable in opposite directions, a device to retard reverse movements of said member, an operative connection therebetween permitting a predetermined range of resistance varying movement of said member in either direction independently of said retarding device and biasing means for said member to retract the same through a range equal to the aforesaid range when said member is released.

14. In a motor controller, the combination with a resistance controlling member movable in opposite directions, a double acting dash-pot and a lost motion connection therebetween including means biasing the former relatively to the latter whereby said member is permitted a limited play independently of said dash-pot when the former is moved in either direction and whereby said member when released is retracted through a range equal to such play.

15. In a motor controller, the combination with a resistance controlling member, an electro-responsive device to operate said member to varying degrees and to thereupon release the same and means whereby said member is insured a definite but only partial return movement when the same is released after a given degree of movement thereof.

16. In a motor controller, the combination with a resistance controlling member, an electro-responsive device to operate said member to varying degrees and to thereupon release the same, and means for retarding movement of said member by said device but permitting a limited movement of said member thereby prior to retardation thereof, said member when released being permitted a limited return movement equal to its aforesaid movement independently of said retarding means.

17. In a motor controller, the combination with a resistance controlling member, of electro responsive means for moving said member to varying degrees in opposite directions and thereupon releasing the same, means for retarding movement of said member in opposite directions but permitting a limited play of the latter independently thereof and biasing means for said member dividing such play for reverse movements thereof and for retracting said member to an equal degree when the same is released after operation thereof.

18. In combination, a motor, a movable resistance controlling member for regulating the same, a retarding device for said member and an operative connection between said device and said member permitting a predetermined range of resistance varying movement of said member independently of said retarding device, said member when released being returnable automatically through a range equal to the aforesaid range.

19. In combination, a motor, a resistance controlling member movable in opposite directions for regulating the same, a device to retard reverse movements of said member, an operative connection between said device and said member permitting a predetermined range of resistance varying movement of said member in either direction independently of said retarding device and biasing means for said member to retract the same through a range equal to the aforesaid range when said member is released.

20. In combination, a motor, a resistance controlling member movable in opposite directions for regulating the same, a double acting dash pot and a lost motion connection between said member and said dash pot including means biasing the former relatively to the latter whereby said member is permitted a limited play independently of said dash pot when the former is moved in either direction and whereby said member when released is retracted through a range equal to such play.

21. In combination, a motor, a resistance controlling member for regulating the same, an electro-responsive device to operate said member to varying degrees and to thereupon release the same and means whereby said member is insured a definite but only partial return movement when the same is released after a given degree of movement thereof.

22. In combination, a motor, a resistance controlling member for regulating the same, an electro-responsive device to operate said member to varying degrees and to thereupon release the same and means for retarding movement of said member by said device but permitting a limited movement of said member thereby prior to retardation thereof, said member when released being permitted a limited return movement equal to its aforesaid movement independently of said retarding means.

23. In combination, a motor, a resistance controlling member for regulating the same, electro-responsive means for moving said member to varying degrees in opposite directions and thereupon releasing the same, means for retarding movement of said member in opposite directions but permitting a limited play of the latter independently thereof and biasing means for said member dividing such play for reverse movements thereof and for retracting said member to an equal degree when the same is released after operation thereof.

In witness whereof I have hereunto subscribed my name.

ALBERT J. HORTON.